UNITED STATES PATENT OFFICE 2,519,325

ANTIHISTAMINE COMPOUNDS

Clarence W. Sondern, Mendham, and Philip J. Breivogel, Glen Ridge, N. J., assignors to White Laboratories, Incorporated, Newark, N. J., a corporation of New Jersey No Drawing. Application January 4, 1947, Serial No. 720,317

1 Claim. (Cl. 260—302)

This invention relates to new and novel compounds and to a method for their preparation, and more particularly to compounds characterized by having a high degree of antihistamine activity.

It is known that fundamentally, clinical manifestations of many allergies are due to tissue liberation of histamine brought about by the offending allergens. In the attempt to relieve such clinical manifestations, it has been proposed to administer compounds to the allergic individual which antagonize or counteract the physiopathologic effects of histamine. Such compounds are referred to as anti-histamine compounds.

Although some progress has been made in this field there has heretofore been discovered no compound which is highly effective and which is reasonably free from undesirable toxic effects. The advantages of a compound or product which could be administered safely and conveniently to an individual suffering from an allergy due to histamine and which could successfully overcome this condition are apparent.

It is therefore an object of the present invention to provide an anti-histamine compound characterized by a low degree of toxicity when used in effective amounts.

An additional object is to provide new chemical compounds useful in treating allergic conditions.

An additional object is to provide new compounds useful as intermediates in the preparation of new and valuable products.

An additional object is to provide a method for preparing new and novel amino compounds and salts thereof having a high degree of anti-histamine activity.

The compounds of the invention include compounds having the general formula

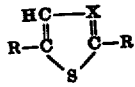

and salts thereof with acids. In the general formula given X represents a member selected from the group consisting of trivalent nitrogen and the methine radical (—CH=) and R represents a member selected from the group consisting of hydrogen and a radical having the general formula

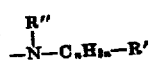

wherein R' represents a number selected from the group consisting of dialkylamino, dicycloalkylamino, N-alkyl-N-cycloalkylamino, 1-pyrialkylamino, 1-piperidino, 4-morpholino and 4-thiamorpholino radicals, R" represents a member selected from the group consisting of benzyl and nuclearly substituted halo-, alkoxy- and alkyl-benzyl radicals, and n is an integer less than 10, not more than one R representing hydrogen. The alkylene group, —$C_nH_{2n}$—, between the two nitrogen atoms may be straight or branched chain. In a preferred modification of the invention alkyl and alkoxy radicals substituent on the benzyl radical contain from 1 to 6 carbon atoms inclusive.

Among the compounds of the invention are included:
2 - (N(dimethylaminomethyl) - N - benzyl-amino)-thiazole
2,5 - bis(N(dimethylaminomethyl) - N - benzylamino)-thiazole
2-(N(diethylaminomethyl)-N-benzyl - amino)-thiazole
2,5-bis(N(diethylaminomethyl)-N-benzyl - amino)-thiazole
2-(N(dibutylaminomethyl)-N - benzyl - amino)-thiazole
2,5-bis(N(dibutylaminomethyl)-N-benzyl - amino)-thiazole
2-(N(dicyclohexylaminomethyl)-N-benzyl - amino)-thiazole
2,5-bis(N(dihexylaminomethyl)-N-benzyl - amino)-thiazole
2-(N(ethylcyclohexylaminoethyl)-N-benzyl-amino)-thiazole
2-(N(methylethylaminomethyl)-N-benzyl - amino)-thiazole
2,5-bis(N(methylethylaminomethyl)-N - benzylamino)-thiazole
2-(N(b-dimethylaminoethyl)-N-benzyl- amino)-thiazole
2,5-bis(N(b-dimethylaminoethyl)-N-benzyl-amino)-thiazole
2-(N(b-dimethylaminoethyl)-N - (chlorobenzyl)-amino)-thiazole
2,5-bis(N(b-dimethylaminoethyl)-N - (4-chlorobenzyl)-amino)-thiazole
2-(N(b-dimethylaminoethyl) - N - (4 - ethylbenzyl)-amino)-thiazole
2,5-bis(N(b-dimethylaminoethyl) - N - (4-ethylbenzyl)-amino)-thiazole
2-(N(b-methylpropylaminoethyl)-N - (2 - ethylbenzyl)-amino)-thiazole
2-(N(b-dimethylaminomethyl)-N - (4-methoxybenzyl)-amino)-thiazole
2,5-bis(N(b-dimethylaminomethyl)-N-(4 - methoxybenzyl)-amino)-thiazole 2-(N(b-diethylaminoethyl)-N-(4-ethoxybenzyl)-amino)-thiazole
2-(N-(b-dimethylaminoisopropyl)-N-benzyl-amino)-thiazole
2,5-bis(N(b-methylpropylaminoethyl)-N-(4-ethylbenzyl)-amino)-thiazole
2-(N-(b-methylhexylaminoethyl)-N-benzyl-amino)-thiazole
2,5-bis(N(b-methylhexylaminoethyl)-N-benzyl-amino)-thiazole
2-(N(piperidinoethyl)-N-methylbenzyl-amino)-thiazole
2-(N-(pyridinoethyl)-N-benzyl-amino)-thiazole
2-(N-(piperidinomethyl)-N-benzyl-amino)-thiazole
2-(N-(4-morpholinoethyl)-N-benzyl-amino)-thiazole
2-(N-(pyridinoethyl)-N-benzyl-amino)-thiazole
2-(N-(piperidinomethyl)-N-benzyl-amino)-thiazole
2-(N-(4-morpholinoethyl)-N-benzyl-amino)-thiazole
2-(N(4-thiamorpholino)-N-benzyl-amino)-thiazole
2,5-bis(N-(piperidinomethyl)-N-benzyl-amino)-thiazole
2-(N-(dimethylaminomethyl)-N-benzyl-amino)-thiophene
2,5-bis(N-(diethylaminomethyl)-N-benzyl-amino)-thiophene
2-(N-dicyclohexylaminomethyl)-N-benzyl-amino)-thiophene
2,5-bis(N-(methylethylaminomethyl)-N-benzyl-amino)-thiophene
2-(N-(b-dimethylaminoethyl)-N-(4-chlorobenzyl)-amino)thiophene
2(N-(b-dimethylaminoethyl)-N-(4-ethylbenzyl)-amino)-thiophene
2-(N-(b-dimethylaminoethyl)-N-(4-methoxybenzyl)-amino)thiophene
2,5-bis(N-(b-diethylaminomethyl)-N-(4-ethoxybenzyl)-amino)-thiophene This invention also includes salts of amino compounds having the formula given with acids, such as hydrochloric, hydrobromic, sulfuric, phosphoric, acetic, palmitic, stearic, propionic, succinic, benzoic, and salicylic acids. The bases of the invention contain more than one basic nitrogen atom and may form salts with one or more chemical equivalents of an acid. Generally speaking, the salts formed with one chemical equivalent of an acid for each mol of the amine are preferred for treatment of allergies due to histamine due to the generally more favorable conditions of pH of aqueous solutions thereof.

A preferred compound is the mono-hydrochloride of 2-(N(b-dimethylaminoethyl)-N-benzyl-amino)-thiazole, i. e., N,N-dimethyl-N'-benzyl-N'-(2-thiazolyl)-ethylenediamine mono-hydrochloride, described and claimed in a concurrently filed copending application, Serial No. 720,318, now Patent No. 2,440,703, which is especially valuable due to its high degree of antihistamine activity, its low degree of toxicity to the individual and its ease of preparation. The preferred compound is best utilized in dosage forms such a tablets, capsules, elixir, syrup or tincture.

Thiazole compounds of the invention having the general formula

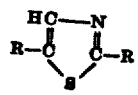

are prepared readily by condensing a 2-halothiazole or a 2,5-dihalothiazole, e. g., 2-bromothiazole or 2,5-dibromothiazole, with a substituted ethylene diamine having the general formula

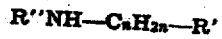

wherein $n$, R' and R'' have the values given previously.

When it is desired to prepare a compound having only one substituent of the character described on the thiazole nucleus, the condensation is carried out using 2-halothiazole and one molecular proportion, or somewhat more, of the amino compound. When it is desired to prepare a di-substituted thiazole of the character described, condensation is carried out using 2,4-dihalothiazole and at least two molecular proportions of the amino compound. Di-substituted thiazoles wherein the substituents in the 2- and 5-positions are different may be prepared by condensing 2,5-dihalothiazole with a mixture of two appropriate etheylene diamine compounds, or step-wise, using first one amine and then the other.

The condensation is effected readily by mixing the halothiazole and the ethylenediamine derivative together with a dehydrohalogenating agent, such as pyridine, picoline, quinoline or sodium acetate, and refluxing the mixture. The reactants are usually mixed in substantially the proportions calculated to give the desired compound, at least sufficient dehydrohalogenating agent, and usually an excess, being included to absorb or combine with all of the hydrogen halide formed during the condensation. Inert diluents may be included in the reaction mixture, if desired. The reaction is usually substantially complete upon refluxing the mixture for from one to five hours and the product may then be recovered in any suitable manner. One convenient way, when the dehydrohalogenating agent is pyridine, consists in distilling most of the pyridine from the reaction mixture, adding sufficient aqueous sodium hydroxide solution to the distillation residue to render it strongly alkaline and extracting the resulting alkaline mixture, e. g., with ether. The extract is dried, e. g., with anhydrous sodium carbonate, and the ether or other extractant removed by distillation. The residue may then be distilled in vacuo and the desired fraction collected. The basic compound thus obtained may, if desired, be purified, e. g., by conversion to the picrate and recrystallization of the latter from methanol or other suitable solvent and then decomposing the picrate with aqueous alkali. The liberated base may be extracted with ether and the ether vaporized. The purified base can be converted to its hydrochloride by dissolving it in anhydrous alcohol and adding alcoholic hydrogen chloride. Upon concentrating the solution and adding acetone, the monohydrochloride of the desired compound is obtained in high yield. If additional purification is desired, the monohydrochloride may be recrystallized, e. g., from a mixture of ethyl alcohol and ethyl acetate.

The ethylenediamine derivatives condensed with a halothiazole in the process just described are prepared readily by reacting a benzyl halide or substitution product thereof, such as 4-chlorobenzyl chloride, 4-chlorobenzyl bromide, 2-bromobenzyl chloride, 3-bromobenzyl chloride, 4-methylbenzyl chloride, 2-n-hexylbenzyl bromide, 4-methoxybenzyl chloride, 2-ethoxybenzyl chloride and p-isopropylbenzyl bromide, with an N,N-disubstituted alkylene diamine, such as dimethylaminoethyl amine, diethylaminomethyl amine, diisopropylaminoethyl amine, b-pyridylethyl amine, b-(4-morpholino)-ethyl amine and b-(1-piperidino)-ethyl amine. The condensation is carried out by warming the substances together, preferably in an inert solvent such as ether, in the presence of a mild alkaline condensing agent, such as sodium or potassium acetate. The reaction product having the formula R"NH—$C_nH_{2n}$—R' may be recovered by evaporating the solvent, taking up the residue in anhydrous alcoholic hydrogen halide, filtering off undissolved inorganic halide, alkalizing the filtrate with an aqueous alkali metal hydroxide and extracting the amine from the alkaline mixture with ether. Upon evaporating the ether from the extract and fractionally distilling the residue in vacuo, the desired diamine is obtained in substantially pure form. When so prepared the diamino compounds are generally colorless or slightly yellowish, oily liquids practically insoluble in water and soluble in alcohol and ether. They form well defined crystalline salts with one or two chemical equivalents of acids. In similar manner a benzyl or substituted benzyl amine can be condensed with an N,N-disubstituted alkyl halide to form the desired diamine compound.

An alternate procedure for the preparation of the intermediate compound having the general formula R"NH—$C_nH_{2n}$—R' involves condensing a benzyl or substituted benzyl amine with an alkylene halide, such as dichloromethane, 1,2-dichloroethane, and 1,4-dibromobutane to form an N-(gamma-haloalkyl)-benzyl amine which is then condensed with an appropriate amine (diethyl amine, dimethyl amine, piperidine, thiamorpholine and the like) through the gamma halogen atom to introduce the R' group, previously defined, into the molecule. Superior yields of products of high purity are obtained by this procedure.

Thiophene compounds of the invention are prepared conveniently in similar manner from bromothiophene or by condensing a 2-amino-or a 2,5-diaminothiophene with a haloamine having the general formula $$\text{Hal.}—C_nH_{2n}—R'$$

(Hal.=halogen) wherein R' has the value given previously. The resulting thiophene derivative is then condensed further with a benzyl halide or substituted benzyl halide, such as those mentioned, to form the desired thiophene compound.

The free thiophene bases form salts similar to those of the thiazole bases.

Certain advantages of the invention are apparent from the following examples which are given by way of illustration only and are not to be construed as limiting.

*Example 1.—N,N-dimethyl-N'-benzyl-ethylenediamine*

A solution of 108 grams of beta-dimethylaminoethyl chloride in 125 milliliters of ether was added over a period of one-half hour and with rapid stirring to a solution of 108 grams of benzylamine and 98 grams of potassium acetate in 500 milliliters of alcohol maintained at about 30° C. Stirring was continued at 30° C. for an additional two hours and then for 6½ hours at 45° to 50° C. After standing overnight at room temperature, the mixture was acidified to congo red with concentrated aqueous hydrochloric acid, about 150 milliliters being required. The mixture was cooled to room temperature and precipitated potassium chloride was removed by filtering and washing the residue with 75 milliliters of alcohol. The combined filtrate and washing were concentrated to 300 milliliters, 150 grams of potassium hydroxide was added and the mixture extracted with 600 milliliters of ether. The ethereal extract was dried over solid potassium hydroxide, the ether evaporated and the oily residue distilled in vacuo. The fraction distilling at 121° to 123° C. at 9 millimeters pressure weighed 33 grams and was practically pure N,N-dimethyl-N'-benzyl-ethylenediamine. The product was a colorless, oily liquid having and index of refraction $N_D^{25}$ of 1.507. It formed a picrate melting at 162° to 164° C.

*Example 2.—N,N-dimethyl-N'-benzyl-ethylene diamine*

One molecular proportion of benzyl amine is refluxed for several hours with one molecular proportion of fused sodium acetate and somewhat more than one molecular proportion of ethylene bromide. The mixture is then stirred into water and sodium carbonate added to a distinct alkalinity. Unreacted ethylene bromide is steam distilled from the mixture and the still residue extracted thoroughly with ether. Upon evaporation of the ether there is obtained an oily product consisting principally of N-(b-bromoethyl)-benzyl-amine. This amine forms a crystalline hydrochloride and picrate.

Equimolecular proportions of dimethyl amine and N-(b-bromoethyl)-benzyl-amine are heated in an autoclave under pressure with about one molecular proportion of sodium acetate. Upon cooling and agitating the contents of the autoclave with dilute sodium hydroxide and then extracting the mixture with ether and evaporating the ether, there is obtained a high yield of N,N-dimethyl-N'-benzyl-ethylenediamine.

*Example 3.—2-(N(b-dimethylaminoethyl)-N-benzyl-amino)-thiazole*

A mixture of 25 grams of 2-bromothiazole, 50 grams of N,N-dimethyl-N'-benzyl-ethylenediamine and 35 grams of pyridine was refluxed for 3½ hours. The temperature of the liquid during refluxing was about 142° C. The pyridine was then removed by distillation in vacuo until the vapor temperature rose to 120° at 30 millimeters. The residue from the distillation was cooled to room temperature, rendered alkaline by adding 50 milliliters of 20 per cent aqueous sodium hydroxide solution and the mixture then extracted with 300 milliliters of ether. The ethereal extract was dried over anhydrous sodium carbonate and the ether removed by distillation. The dark, oily residue was then distilled in vacuo and the fraction which boiled at 130° to 155° C. at 15 millimeters was collected separately. This fraction weighed 14.6 grams and consisted principally of 2-(N(b-dimethylaminoethyl)-N-benzyl-amino)-thiazole. The base was purified by conversion to the picrate which, after recrystallization from methanol, melted at 138° to 141° C. The free base was isolated from the picrate by treating the latter with aqueous sodium hydroxide, extracting the mixture with ether and distilling the ether. A solution of 10.1 grams of the free base in 10 millimeters of anhydrous alcohol was then mixed with a solution of 1.39 grams of anhydrous hydrogen chloride in 13.9 milliliters of anhydrous alcohol. Upon concentrating the solution of a volume of 20 milliliters and adding acetone, the monohydrochloride of 2-(N(b-dimethylaminoethyl)-N-benzyl)-thiazole was precipitated. Upon filtering the mixture and drying the precipitate there was obtained 10.4 grams of the monohydrochloride. After recrystallization from a mixture of 2 parts of ethyl acetate and 1 part of anhydrous ethanol and then from n-butanol, there was obtained 8.4 grams of the purified monohydrochloride in the form of small white flakes melting at 176° to 177° C. The monohydrochloride was soluble in water, ethanol, and butanol but practically insoluble in ether free from alcohol.

*Example 4.—2-(N-(b-dimethylaminoethyl)-N-benzyl-amino)-thiophene*

A mixture of 0. mol each of 2-aminothiophene and beta-dimethylaminoethyl chloride and 0.2 mol of pyridine is refluxed for about two hours and then mixed with sufficient dilute sodium hydroxide to render the mixture strongly alkaline. Pyridine and excess reactants are distilled from the mixture with steam and the still residue cooled and extracted with ether. The ethereal extract is dried over anhydrous sodium sulfate and the ether volatilized. The residue of 2-(N-(b-dimethylaminoethyl)-amino)-thiophene is heated in alcoholic solution with 0.1 mol of benzyl chloride for about one hour, then cooled, and mixed with an excess of dilute aqueous sodium hydroxide and distilled with steam to remove unreacted benzyl chloride and alcohol. The still residue is extracted with ether, the ethereal extract dried and the ether vaporized. The oily residue of 2-(N-(b-dimethylaminoethyl)-N-benzyl-amino)-thiophene is converted to the hydrochloride by dissolving it in warm dilute hydrochloric acid and allowing the solution to crystallize. The yield is about 35 per cent of theory based on the 2-aminothiophene used.

We claim:

A compound selected from the class consisting of compounds having the general formula

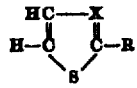

wherein X represents a member selected from the group consisting of trivalent nitrogen and the methine radical and R represents an (N-basic-alkylamino)-N-benzyl-amino radical, and salts thereof with acids.

CLARENCE W. SONDERN.
PHILIP J. BREIVOGEL.

REFERENCES CITED

The following references are of record in the file of this patent:

UNITED STATES PATENTS

| Number | Name | Date |
|---|---|---|
| 1,723,695 | Hahl et al. | Aug. 6, 1929 |
| 1,836,486 | Morton | Dec. 15, 1931 |
| 2,440,703 | Sondern et al. | May 4, 1948 |

FOREIGN PATENTS

| Number | Country | Date |
|---|---|---|
| 913,959 | France | Sept. 1946 |

OTHER REFERENCES

Proceedings of the Society for Experimental Biology and Medicine, vol. 63, Oct. 1946, page 159.

Chem. Abst., vol. 27, page 819, citing German Patent 559,500.